UNITED STATES PATENT OFFICE.

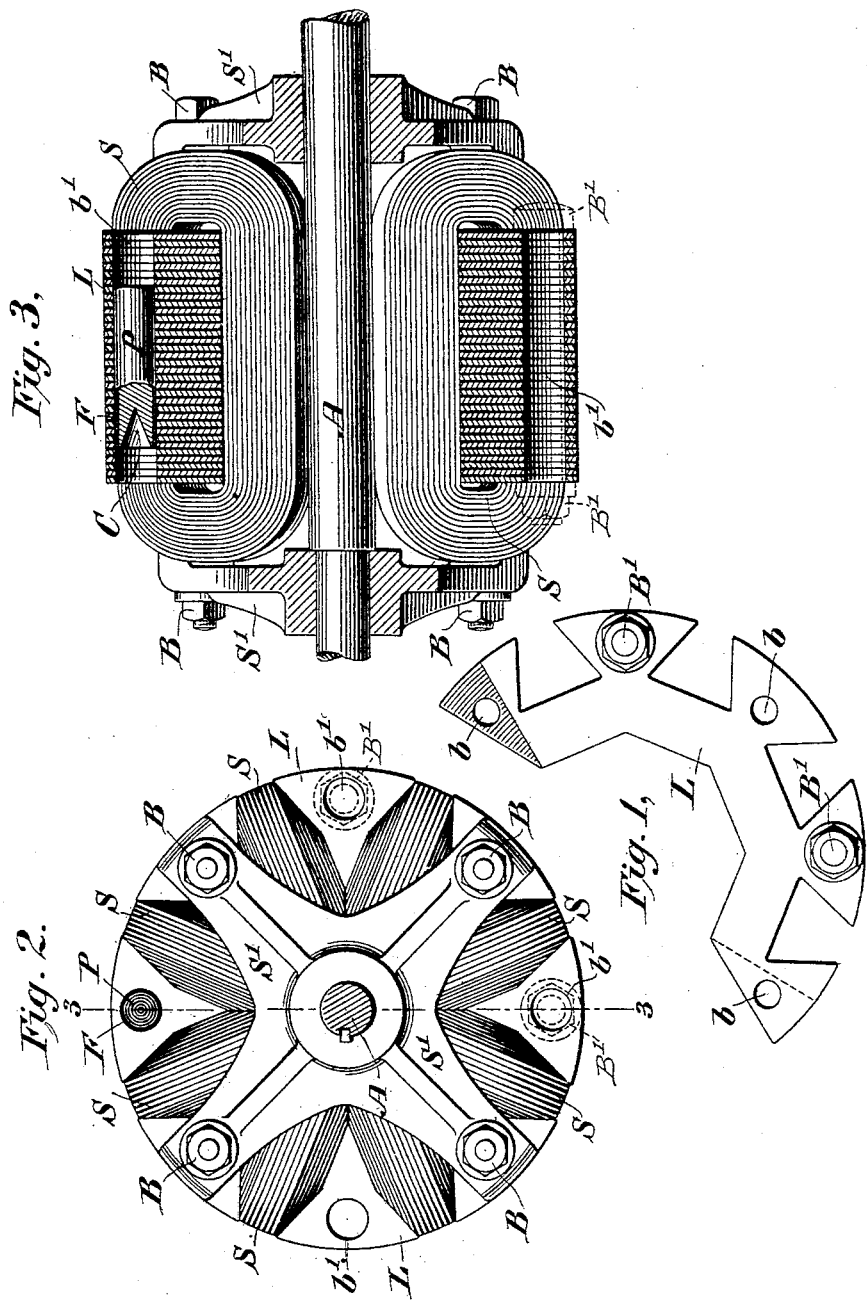

GANO S. DUNN, OF NEW YORK, N. Y., ASSIGNOR TO THE CROCKER-WHEELER ELECTRIC COMPANY, OF SAME PLACE.

BALANCED ARMATURE FOR DYNAMO-ELECTRIC MACHINES OR ELECTRIC MOTORS AND METHOD OF BALANCING SAME.

SPECIFICATION forming part of Letters Patent No. 493,375, dated March 14, 1893.

Application filed June 6, 1892. Serial No. 435,726. (No model.)

*To all whom it may concern:*

Be it known that I, GANO S. DUNN, a citizen of the United States of America, residing at New York, county of New York, State of New York, have invented certain new and useful Improvements in Armatures for Dynamo-Electric Machines or Electric Motors, of which the following is a specification.

My invention is directed particularly to the armature or other rotary part or parts of machines of the above nature, and its object is to obtain an accurate and stable balance of the rotary part, so that it will not be subjected to undue strains while running at high speeds. This object is attained by the practice of the methods and the use of the means hereinafter described, the novel features being particularly pointed out in the claims which follow.

In the construction of electric motors or dynamo electric machines it is very important that the armature or other rotary part thereof should be accurately balanced and it was customary prior to my invention to effect this balance by resting the axis of the completed armature on leveled parallel knife edges approximately free from friction and then securing bits of lead to the ends of the bolts on the armature heads or spiders and at various points until the balance was attained. This method is unsatisfactory for the reason that even though a static balance be effected, the centers of gravity are so distribtued that centrifugal force, due to the high speeds of the armature, will tend to make it run unsteady. The pieces of lead or other balancing weights often become detached and fly off, damaging the machine in various ways and causing no end of annoyance.

My novel method and means of effecting an accurate balance of this part of an electric motor or dynamo electric machine, avoid all of these objections.

In order that my invention may be fully understood by those skilled in the art, reference is had to the accompanying drawings in which like letters of reference represent like parts wherever used.

Figure 1 is an end view of one-half of an armature core of well known form, illustrating a part of my improvement. Fig. 2 is an end view of a completed armature of the same kind; and Fig. 3 is a sectional view of the same on line 3—3 Fig. 2, the means of carrying out my improved methods being illustrated in all of said figures as will now be fully explained.

A is the axle to which are secured the spiders or hubs S' S' by keys in the usual manner.

L is the laminated core made with alternate punched disks, of iron and insulating material, having trapezoidal surface notches for the bobbins or coils S S.

$b\ b$ are holes extending through all of the laminæ for the sustaining bolts B B. I have shown four such holes and four spider arms S' with a like number of bolts B B, although any preferred number may be used. As already indicated it has heretofore been the practice to bolt the laminæ of L together by bolts B B and then to anneal and insulate the completed core after which it is wound either in halves or as a whole, the bolts removed and the completed armature bolted to the spider as shown in Figs. 2 and 3.

In the construction, of armatures I utilize an additional set of bolt holes $b'\ b'$ alternating with the holes $b$ and preferably of somewhat larger diameter. I assemble the laminæ as before either as a completed core or in halves or smaller sections as desired, bolting them together by two or more pairs of assembling bolts B' B' passing through the holes $b'\ b'$. The part or parts as thus constructed is or are now annealed and japanned or treated as is usual and then wound, shellaced and allowed to stand till dry or set. The armature as thus built and treated is now secured to the spiders or hubs S' S' by the spider bolts B B passing through the unoccupied holes $b\ b\ b\ b$, and after the nuts on these bolts are all firmly driven home, the idle or construction bolts B' B' shown in dotted lines in Figs. 2 and 3 may all be removed. The bolts B B having relieved the bolts B' B' of all strain upon them, the armature core cannot swell and hence the structure is completed without damaging strains or ruptures. The next step is the balancing of the structure which I attain by inserting within the holes $b'\ b'$ &c., pieces of lead P, surrounded with insulating material, and I then use a pair of punches from opposite ends to turn the edges into frictional contact with the surface and thus secure them in place as illustrated in Fig. 3 at C. The amount of lead P and the proportional distribution in the holes $b'$ $b'$ &c., will depend of course upon the evil to be corrected, and several trials may be required before an accurate balance is had, but when once attained it will be so perfect as to make the shaft of the armature also a "principal axis of figure" and no distorting strains will result from its rotation. It is also quite apparent that I may locate the lead or weight P at any point or points in one or more of the holes $b'$ $b'$ thereby being able to compensate for unequal weight at various portions of the length of the core.

I believe it is broadly new, with me to balance the armature or rotary part of an electric motor or dynamo electric machine by inserting one or more counteracting masses within the body af the core, and my claims are to be construed as of the most generic scope in this particular this feature being the first and most essential part of my invention.

Having thus described my invention, what I claim, and desire to secure by Letters Patent of the United States, is—

1. The described method of balancing an armature or other rotary part of an electric motor consisting in securing one or more pieces of lead or equivalent material at one or more points in one or more openings extending substantially through the body of the rotary part.

2. The described method of balancing an armature consisting in inserting within the core of the armature one or more insulated masses of metal and in securing said mass or masses against movement in a direction parallel with the axis of the armature.

3. An armature core provided with one or more openings extending substantially parallel with the sustaining shaft in combination with one or more balancing masses located therein, substantially as described.

4. An armature having a core provided with holes or openings located at intervals in combination with one or more masses of balancing material located in such of said openings and in such proportion as will balance it while in motion and at rest substantially as described.

5. An armature core having a series of bolt holes and bolts extending therethrough and secured to a hub or spider in combination with a series of intermediate holes for the disposition of balancing weight substantially as described.

6. A toothed armature core having bolt holes and balancing holes in alternate teeth substantially as described.

7. A toothed armature core having bolt holes $b$ located in alternate teeth in combination with balancing holes $b'$ and one or more balancing weights P secured in one or more of said holes $b'$ substantially as described.

8. A toothed armature core having bolt holes in the teeth and one or more balancing holes located also in the teeth substantially as described.

GANO S. DUNN.

Witnesses:
C. J. KINTNER,
S. S. WHEELER.